(No Model.)
C. A. HOPKINS.
PLOW.
No. 561,227. Patented June 2, 1896.
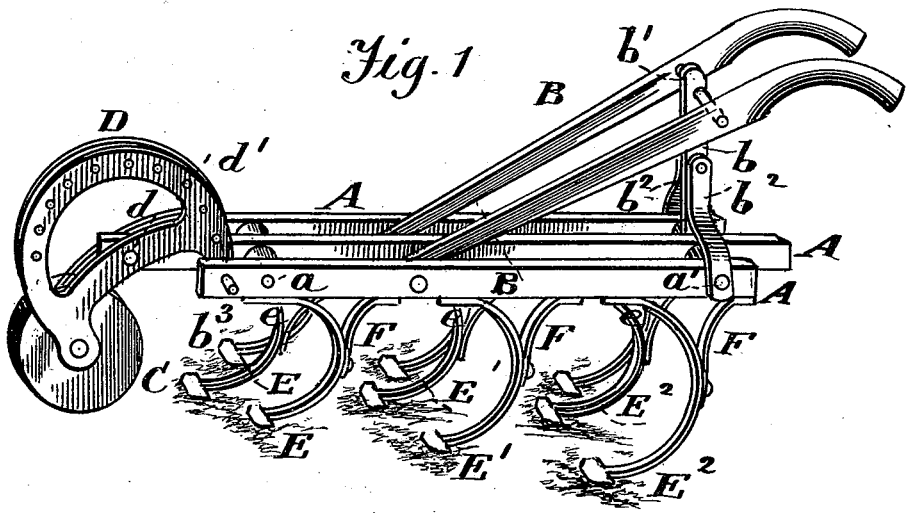
Fig. 1
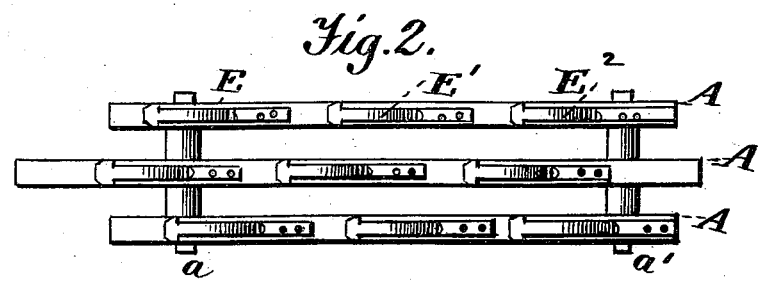
Fig. 2
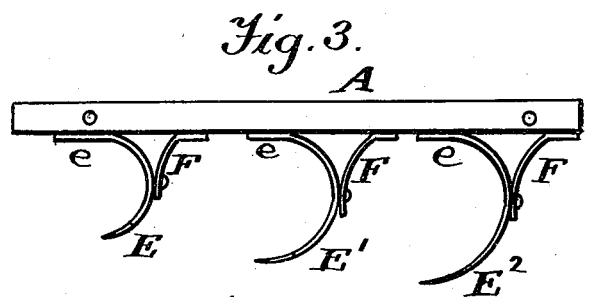
Fig. 3
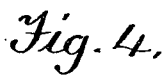
Fig. 4
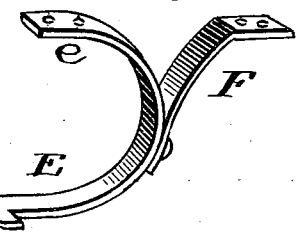
Witnesses.
A. Ruppert,
H. A. Daniels
Inventor:
Cyrenias A. Hopkins
Per
Thomas P. Simpson
atty

UNITED STATES PATENT OFFICE.

CYRENIUS A. HOPKINS, OF CLAYVILLE, NEW YORK.

PLOW.

SPECIFICATION forming part of Letters Patent No. 561,227, dated June 2, 1896.

Application filed February 9, 1895. Serial No. 537,798. (No model.)

*To all whom it may concern:*

Be it known that I, CYRENIUS A. HOPKINS, a citizen of the United States, residing at Clayville, in the county of Oneida and State of New York, have invented certain new and useful Improvements in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a multiple plow whereby seed-furrows may be made by once running the same across a field and back, the seed then planted on the ridges made, and the cores left between the rows plowed out after the crop has begun to grow.

Figure 1 of the drawings is a perspective view of my multiple plow; Fig. 2, a bottom plan view of the teeth and bars or beams on which they are secured; Fig. 3, a side elevation of one of the bars or beams, showing the relative position of the teeth; Fig. 4, a detail view of one of the teeth or breaking-up plows.

In the drawings, A represents three parallel longitudinal bars or beams held by the cross-bolts $a$ $a'$ to intermediate spacing-blocks, thus separating them to a proper distance apart.

B are the handles, fastened in front to the middle bar A and supported at the rear by a standard $b$, rising vertically from the middle bar to a spacing-rod $b'$ between the handles B.

$b^2$ $b^2$ are lateral braces to the standard $b$, held at their ends by the bolt $a$, which is threaded on its end, so as to receive a suitable clamping-nut.

C is the gage-wheel, journaled in and between the arc plates D D, which turn on a central pin $d$ and have a series of circumferential holes $d'$, so that the wheel may be adjusted in height by setting the stop-pin $b^3$ in the proper hole $d'$.

E E' E² are the three plow-teeth of each bar, the same being sharp in front and shaped to move horizontally, so as to cut, lift, and crumble a piece of soil two inches in depth and four inches in breadth. The front tooth or plow runs two inches below the surface, the next tooth E' runs two inches deeper, and the rear tooth E² goes two inches deeper than tooth E', the teeth of each bar being thus made to break up a piece of earth six by four inches, while all the nine teeth will break up six by twelve inches of earth. By running the plow in a straight line across the field and back a seed-bed two feet wide is made, upon which corn may be at once planted, while a core of two feet between the beds is left, less or more. This may be cut out and brought into good tilth by the plow after the plants are growing.

The teeth are provided with the curved shanks $e$, which are bolted to the under part of the bars A, may be supported by the rear braces F, and are sufficiently far apart to allow ordinary clods or stones to pass without clogging the plow.

Having thus described all that is necessary to a full understanding of my invention, what I claim as new, and desire to protect by Letters Patent, is—

A plow provided with three parallel beams, each beam having three alined plows of which the second has a longer standard and extends down farther than the first, and the third has a still longer standard than the second and extends still deeper into the ground as and for the purpose set forth.

In testimony whereof I affix my signature in presence of two witnesses.

CYRENIUS A. HOPKINS.

Witnesses:
F. W. FISK,
HENRY PUGH.